United States Patent
Suzuki et al.

(10) Patent No.: US 7,063,393 B2
(45) Date of Patent: Jun. 20, 2006

(54) ELECTRONIC BRAKE SYSTEM WITHOUT PUMP UNIT

(75) Inventors: Motoshi Suzuki, Nagoya (JP); Haruo Arakawa, Toyota (JP); Takayuki Takeshita, Anjo (JP); Takahisa Yokoyama, Anjo (JP)

(73) Assignees: Advics Co., Ltd., Aichi-ken (JP); Denso Corporation, Kariya (JP)

( * ) Notice: Subject to any disclaimer, the term of this patent is extended or adjusted under 35 U.S.C. 154(b) by 311 days.

(21) Appl. No.: 10/216,851

(22) Filed: Aug. 13, 2002

(65) Prior Publication Data

US 2003/0038541 A1 Feb. 27, 2003

(30) Foreign Application Priority Data

Aug. 22, 2001 (JP) .............................. 2001-251890
Aug. 22, 2001 (JP) .............................. 2001-251891
Jun. 5, 2002 (JP) .............................. 2002-164395

(51) Int. Cl.
*B60T 13/74* (2006.01)

(52) U.S. Cl. .......................... 303/3; 303/15; 303/9.62; 303/13; 303/115.2

(58) Field of Classification Search ................ 303/152, 303/9.62, 9, 15, 13, 20, 115.2, 9.63, 116.2, 303/3; 188/358, 151 R
See application file for complete search history.

(56) References Cited

U.S. PATENT DOCUMENTS

| | | | |
|---|---|---|---|
| 4,653,815 A | | 3/1987 | Agarwal et al. |
| 4,998,782 A | * | 3/1991 | Thatcher et al. ............ 303/142 |
| 5,107,967 A | | 4/1992 | Fujita et al. |
| 5,302,008 A | * | 4/1994 | Miyake et al. ................. 303/14 |
| 5,308,154 A | * | 5/1994 | Matouka ................... 303/115.2 |
| 5,312,172 A | * | 5/1994 | Takeuchi .................. 303/113.1 |
| 5,887,954 A | | 3/1999 | Steiner et al. |
| 6,070,949 A | * | 6/2000 | Hariu et al. ................ 303/9.61 |
| 6,135,575 A | * | 10/2000 | Feigel et al. ............. 303/113.4 |
| 6,196,642 B1 | * | 3/2001 | Sekiguchi ................ 303/115.4 |
| 6,315,370 B1 | | 11/2001 | Feigel et al. |
| 6,412,882 B1 | * | 7/2002 | Isono et al. ............. 303/114.1 |
| 6,439,674 B1 | | 8/2002 | Niino |
| 6,604,795 B1 | | 8/2003 | Isono et al. |
| 6,607,253 B1 | * | 8/2003 | Yamamoto et al. ......... 303/112 |

FOREIGN PATENT DOCUMENTS

| | | |
|---|---|---|
| DE | 199 39 950 A1 | 11/1998 |
| DE | 199 44 590 A1 | 9/1999 |
| JP | A-H01-262244 | 10/1989 |

(Continued)

OTHER PUBLICATIONS

Office Action Issued by Japanese Patent Office on Mar. 10, 2006 in corresponding application of JP2002-164395 (copy and translation enclosed).

*Primary Examiner*—Melanie Torres
(74) *Attorney, Agent, or Firm*—Posz Law Group, PLC

(57) ABSTRACT

In an electronic brake system, a brake pedal is operated by a driver according to a requisite braking force. Wheel cylinders equipped at respective vehicle wheels generate braking forces at the respective vehicle wheels. A master cylinder applies a brake fluid pressure to generate the respective wheel cylinder pressures. A pedal operation amount detection portion detects a stroke amount of the brake pedal. The brake pedal and the master cylinder are isolated from each other. The motor is driven based on the pedal operation amount detected by the pedal operation amount detection portion and then controls the brake fluid pressure.

24 Claims, 9 Drawing Sheets

FOREIGN PATENT DOCUMENTS

| | | |
|---|---|---|
| JP | A-4-146866 | 5/1992 |
| JP | A-H05-65061 | 3/1993 |
| JP | 406183330 A * | 7/1994 |
| JP | 2000-203400 | 7/2000 |

* cited by examiner

ELECTRONIC BRAKE SYSTEM WITHOUT PUMP UNIT

CROSS REFERENCE TO RELATED APPLICATIONS

This application is based upon and claims the benefit of Japanese Patent Application No. 2001-251890 filed on Aug. 22, 2001, No. 2001-251891 filed on Aug. 22, 2001, and No. 2002-164395 filed on Jun. 5, 2002, the contents of which are incorporated herein by reference.

FIELD OF THE INVENTION

The present invention relates to an electronic brake system that generates braking force with a motor driven based on brake pedal operation.

BACKGROUND OF THE INVENTION

Conventionally, a typical vehicle brake system has a pump that is driven to generate a required braking force based on the brake pedal operation. In such a brake system, for example, brake fluid discharged from the pump is introduced into a master cylinder (hereinafter referred to as M/C) to push an M/C piston, which in turn generates brake fluid pressures in wheel cylinders (hereinafter referred to as W/Cs). In a hydraulic servo type brake system, brake fluid discharged from the pump is introduced into a hydro booster through a regulation valve to increase pressure thereof. The pressurized brake fluid is introduced into the W/Cs through the M/C and used for generating W/C pressures.

The above brake system requires many parts. That is, a regulation valve, a pump and conduits for carrying the brake fluid are required. Because a pump is required for increasing the brake fluid pressure, brake system energy efficiency is often decreased, and the pump typically generates undesirable noise.

SUMMARY OF THE INVENTION

It is therefore an object of the present invention to provide a brake system that is capable of obviating the above problems.

It is another object of the present invention to provide a brake system that is capable of decreasing the number of brake system parts.

It is another object of the present invention to provide a brake system that is capable of increasing brake system energy efficiency and decreasing operational noise.

According to an electronic brake system of the present invention, a brake pedal is operated by a driver. Vehicle wheels are equipped with respective W/Cs that generate braking force at each of the respective wheels. A M/C applies brake fluid pressure at each of the respective W/Cs. A pedal operation amount detection portion detects an operation amount of the brake pedal. A motor controls the brake fluid pressure in the M/C and is driven based on the pedal operation amount detected by the pedal operation amount detection portion.

Therefore, the M/C pressure is generated by the motor, and the W/C pressures are generated based on the M/C pressure. Therefore, since a pump is not required, the number of parts of the electronic brake system is reduced, energy efficiency is increased and the operational noise is decreased.

It is preferable that a stroke simulator is connected to the brake pedal and isolated from the M/C, and that the brake pedal receives a reactive pressure from the stroke simulator when the driver pushes the brake pedal. Also, a gear unit may be alternatively adopted to convert a rotational power generated by the motor to linear motion to drive a piston rod equipped in the M/C.

According to an electronic brake system of the present invention, a failsafe cylinder generates a brake fluid pressure in conjunction with operation of the brake pedal. The electronic brake system may act in a first operational mode and a second operational mode. In the first operational mode, brake fluid pressures in the wheel cylinders are generated based on the brake fluid pressure in the M/C when the motor is driven. Also, in the second operational mode, the brake fluid pressures in the wheel cylinders are generated based on the brake fluid pressure generated in the failsafe cylinder when the motor is not driven. Therefore, a braking force may still be generated even if the first operational mode is non-operational.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

Figure 1:
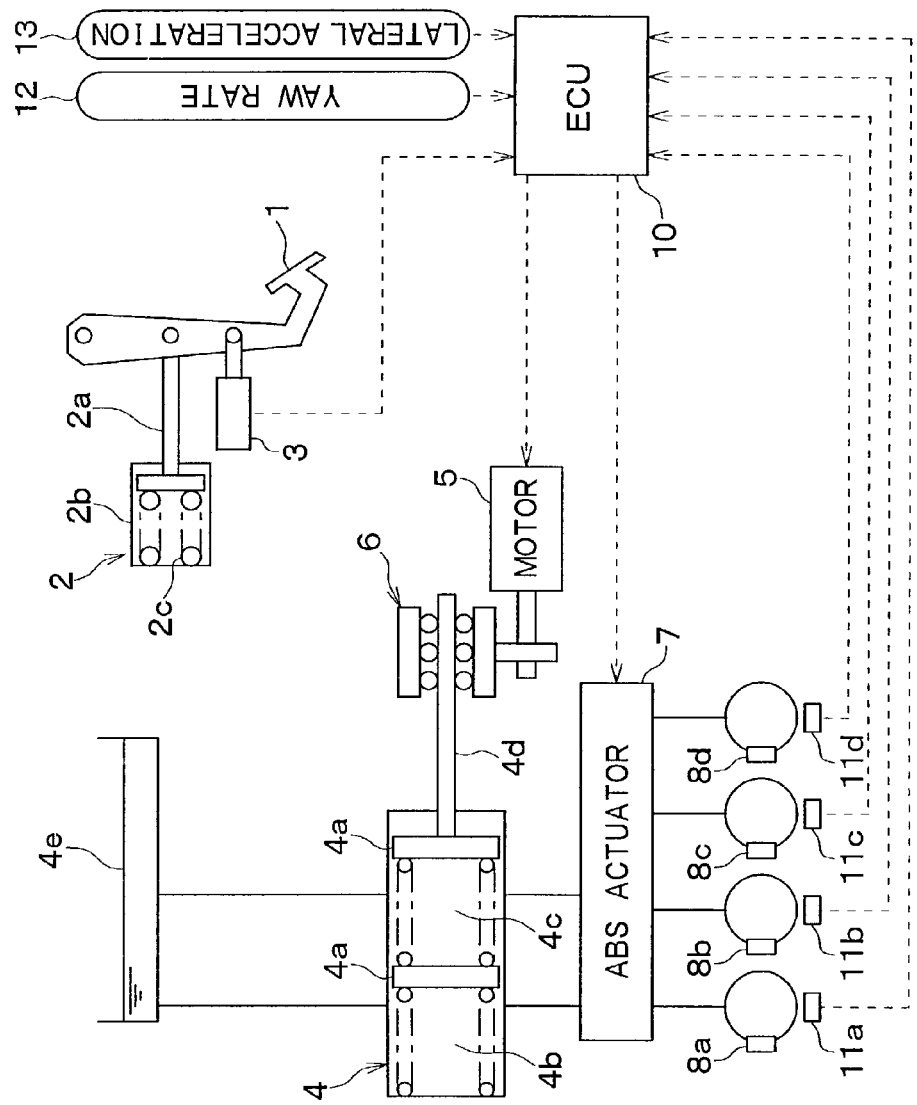
FIG. 1 shows a schematic view of an electronic brake system according to a first embodiment of the present invention.

The present invention will be described further with reference to various embodiments shown in the drawings.

First Embodiment

Referring to FIG. 1, an electric bake system includes a brake pedal 1, a stroke simulator 2, and a pedal operation amount sensor 3. The brake pedal 1 is operated with respect to requisite braking by a driver. The stroke simulator 2 includes a piston 2a, a cylinder 2b and a spring 2c. The piston 2a is connected with and pushed by the brake pedal 1, and it therefore slides along an inside wall of the cylinder 2b. The spring 2c is located in the cylinder 2b. Therefore, if the brake pedal 1 is depressed by the driver, a reactive force corresponding to a pedal operation amount is applied to the brake pedal 1, and a pedal stroke is acquired. The pedal operation amount sensor 3 is also connected to the brake pedal 1 to detect, for example, pedal stroke amount or pedal pressure. The pedal operation amount sensor 3 corresponds to a pedal operation amount detection portion.

The electrical brake system also includes a M/C 4, a motor 5, a gear unit 6, an ABS actuator 7 and W/Cs 8a–8d located at respective vehicle wheels (not shown). These elements are isolated from the brake pedal 1.

The M/C 4 is divided into a primary chamber 4b connected to a first brake conduit circuit and a secondary chamber 4c connected to a second brake conduit circuit by master cylinder pistons (M/C pistons) 4a. The M/C pistons 4a are pushed based on movement of a piston rod 4d that is movable in an axial direction thereof. Therefore, brake fluid pressures in the respective chambers 4b, 4c (i.e., M/C pressure) increase, and brake fluid pressures in the respective W/Cs 8a–8d (hereinafter referred to as W/C pressures) then increase. The M/C 4 also has a M/C reservoir 4e with which the respective chambers 4b, 4c communicate.

The motor 5 generates rotational power (output) corresponding to the detected value of the pedal operation amount sensor 3 and vehicle driving condition. The gear unit 6 is constructed as a ball screw or rack and pinion and transforms the rotational power generated by the motor 5 to linear motion for driving the piston rod 4d. That is, when the gear unit 6 transforms the rotational power of the motor 5 to linear motion, the piston rod 4d is moved by the linear motion. Therefore, the motor 5 generates the M/C pressure and the W/C pressures corresponding to the rotational power thereof. Incidentally, a speed decreasing gear and a speed increasing gear can be alternatively equipped in the gear unit 6 to regulate a motor requisite torque and a requisite axial tension.

An ABS actuator 7 is a conventional actuator that can independently control respective W/C pressures of the W/Cs 8a–8d. For example, the respective W/C pressures may be independently controlled to a pressure increase mode, a pressure maintain mode and a pressure decrease mode. Since the ABS actuator 7 is of a well-known construction, detailed discussion regarding its construction and operation will be omitted.

The electronic brake system further includes an ECU 10 for driving the motor 5 and the ABS actuator 7. The ECU 10 obtains a detected signal from the pedal operation amount sensor 3, wheel speed signals from wheel speed sensors 11a–11d, a yaw rate signal from a yaw rate sensor 12 equipped in the vehicle and a lateral acceleration signal from a lateral acceleration sensor 13 equipped in the vehicle. Incidentally, the wheel speed sensors 11a–11d, the yaw rate sensor 12 and the lateral acceleration sensor 13 correspond to vehicle condition detection portions.

Referring to FIGS. 2 to 5, execution of brake fluid pressure control by the electronic brake system of the present invention will now be discussed.

Figure 2:
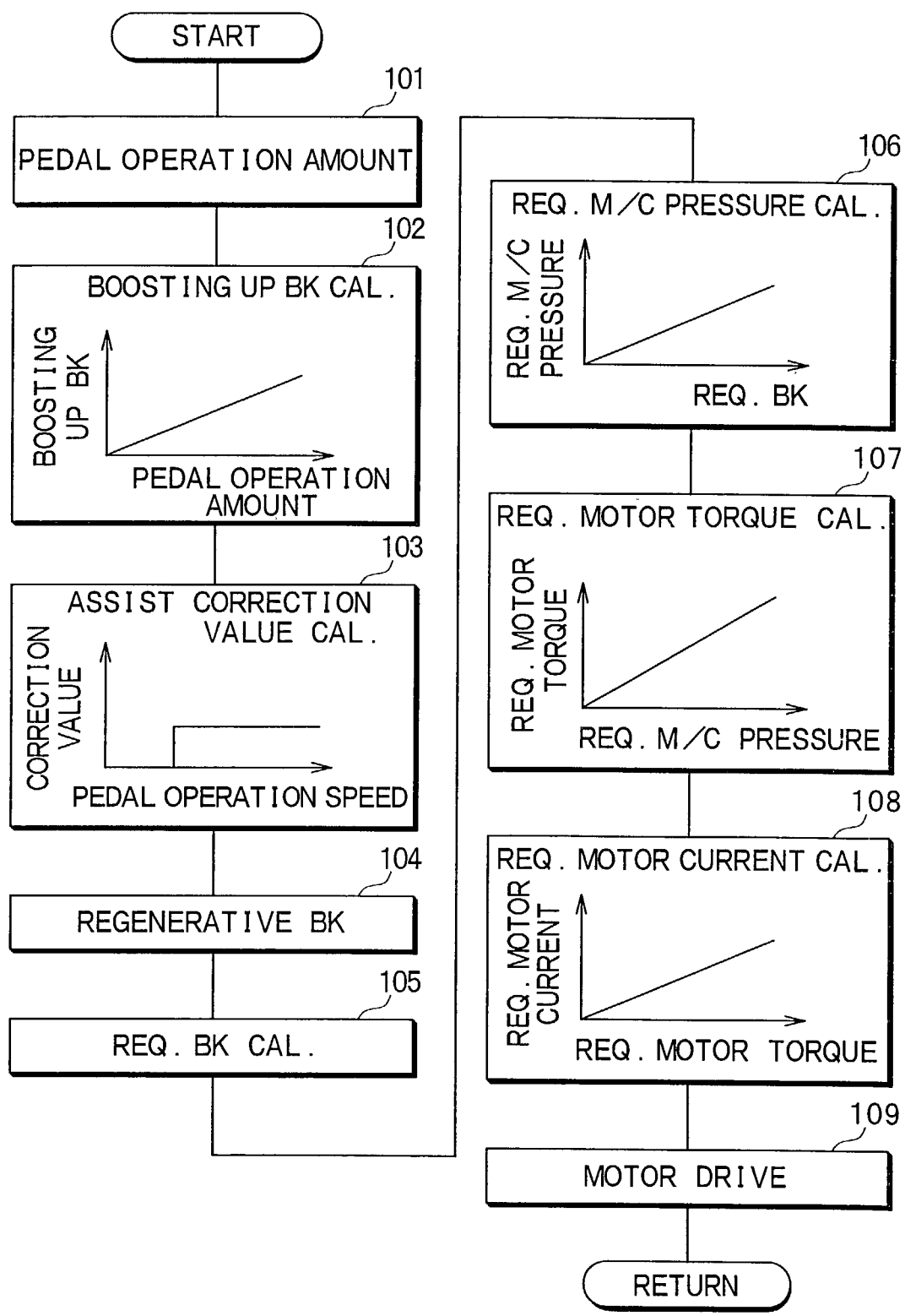
FIG. 2 shows a flow chart illustrating a brake system control process according to the first embodiment.

FIG. 2 shows processing that is executed by the ECU 10 when the brake pedal 1 is depressed by the driver. At 101, the pedal operation amount is determined based on the detected signal from the pedal operation amount sensor 3. At 102, a braking force (BF) calculation for boosting control is executed as brake boosting control processing. Specifically, a braking feature such as, for example, the brake feeling of a driver, is selected as a relationship between the pedal operation amount and the braking force for the boosting control. Next, a requisite braking force is determined from a formula or map that defines the braking feature. Therefore, the braking force calculation for boosting control is completed and the requisite braking force (boost up control braking force) is determined.

At 103, a brake assist correction value calculation is executed as brake assist control processing. Specifically, a pedal operation speed such as, for example, a pedal stroke speed or a pedal pressure change speed is calculated based on the detected signal from the pedal operation amount sensor 3. Next, the brake assist correction value to be added to the requisite braking force is calculated based on the pedal operation speed. For example, if it is determined that a large braking force is required because the pedal operation speed is fast, the brake assist correction value is defined to increase the requisite braking force.

At 104, a regenerative braking force input is executed as a cooperation control with regenerative braking. When the cooperation control with regenerative braking is conducted, an actual requisite braking force is equal to the requisite braking force after the regenerative braking force is deducted. Accordingly, a signal corresponding to the regenerative braking force is acquired.

At 105, the requisite braking force is calculated based on a formula that adds the braking force for boosting control to the brake assist correction value, and subtracts the regenerative braking force. The respective values calculated at 102 to 104 respectively are used for the calculation. Therefore, the requisite braking force is calculated based on the brake boosting control, the brake assist control and the cooperation control with regenerative braking.

At 106, a requisite M/C pressure is calculated based on the requisite braking force calculated at 105. The requisite M/C pressure is equal to an M/C pressure converted from the requisite braking force and is determined based on a conventional formula that is generally used in the brake technology field. For example, the requisite M/C pressure is calculated based on the following formula: the requisite M/C pressure=((requisite braking force)×(tire radius))/((respective distances between W/Cs and tire centers)×(W/C area)). The distance between the W/C and center of each tire is equal to the respective distances between the W/Cs 8a–8d to the respective tire centers; that is, the distances between portions for generating frictional force on the tires and the centers of respective tires.

At 107, a requisite motor torque of the motor 5 is calculated based on the requisite M/C pressure calculated at 106. The requisite motor torque of the motor 5 equals motor torque converted from the requisite M/C pressure and is determined based on the following formula: requisite motor torque=((the requisite M/C pressure)×(M/C diameter))/(gear ratio of the speed decreasing gear). The gear ratio of the speed decreasing gear is a gear ratio of the gear unit 6.

At 108, a requisite motor electrical current to be applied to the motor 5 is calculated based on the requisite motor torque calculated at 107. The requisite motor electrical current equals an electrical current converted from the requisite motor torque. Since the motor torque generated by the motor 5 is proportional to a motor electrical current, the requisite motor electrical current is calculated, for example, using the following formula: requisite motor electrical current=(requisite motor torque)/(motor torque constant).

Accordingly, at 109, the calculated requisite motor electrical current is applied to the motor 5 to drive it. Therefore, the motor 5 is driven in consideration of the brake boosting control, the brake assist control and the cooperation control with regenerative braking.

As mentioned above, when the brake pedal 1 is pushed, the brake boosting control, the brake assist control and the cooperation control with regenerative braking are performed, and the requisite motor electrical current is calculated and applied to the motor 5 based on these brake controls. Then, the piston rod 4d is driven by the motor 5 via the gear unit 6, and the M/C pistons 4a are depressed to increase the M/C pressure. Therefore, W/C pressures are generated based on the M/C pressure.

If at least one of the wheels is determined to be locked, ABS control is performed to avoid such locking by controlling the pressure increase mode, pressure maintain mode and pressure decrease mode to the corresponding wheel. However, since the ABS actuator 7 performs the ABS control in a manner similar to conventional ABS control, details of such operation will be omitted.

Figure 3:
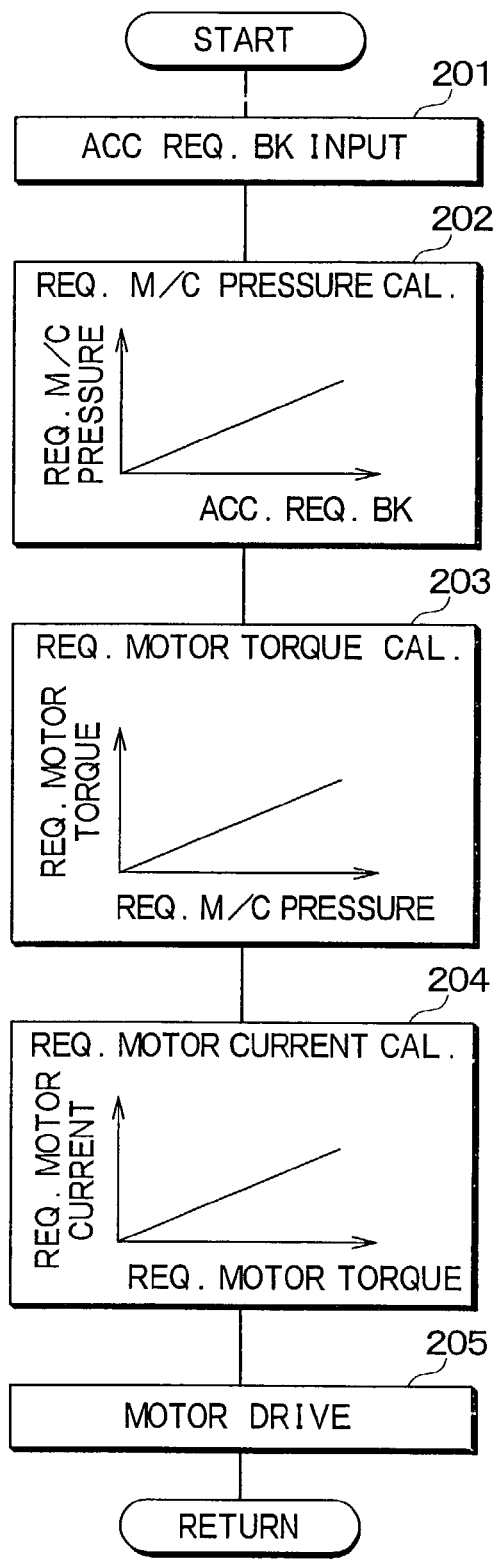
FIG. 3 shows a flow chart illustrating ACC (Active Cruise Control) processing according to the first embodiment.

FIG. 3 shows ACC processing by the ECU 10. The processing is executed, for example, when the driver selects an ACC mode to control vehicle-vehicle distance (i.e., distance between the vehicle and another vehicle in front of the vehicle).

At 201, the requisite braking force as the ACC is calculated using conventional ACC processing. For example, a target deceleration is determined based on the vehicle-vehicle distance, and the requisite braking force is then calculated based on the target deceleration.

At 202 through 204, a requisite M/C pressure, a requisite motor torque and a requisite motor electrical current are respectively calculated based on the requisite braking force as in 106 through 108 in FIG. 2. At 205, the requisite motor electrical current is applied to the motor 5 as at 109 in FIG. 2.

Therefore, the motor 5 is driven based on the ACC processing. Then, the piston rod 4d is driven by the motor 5 via the gear unit 6, and the M/C piston 4a is depressed to increase the M/C pressure. Therefore, the W/C pressures are generated with respect to the M/C pressure.

Figure 4:
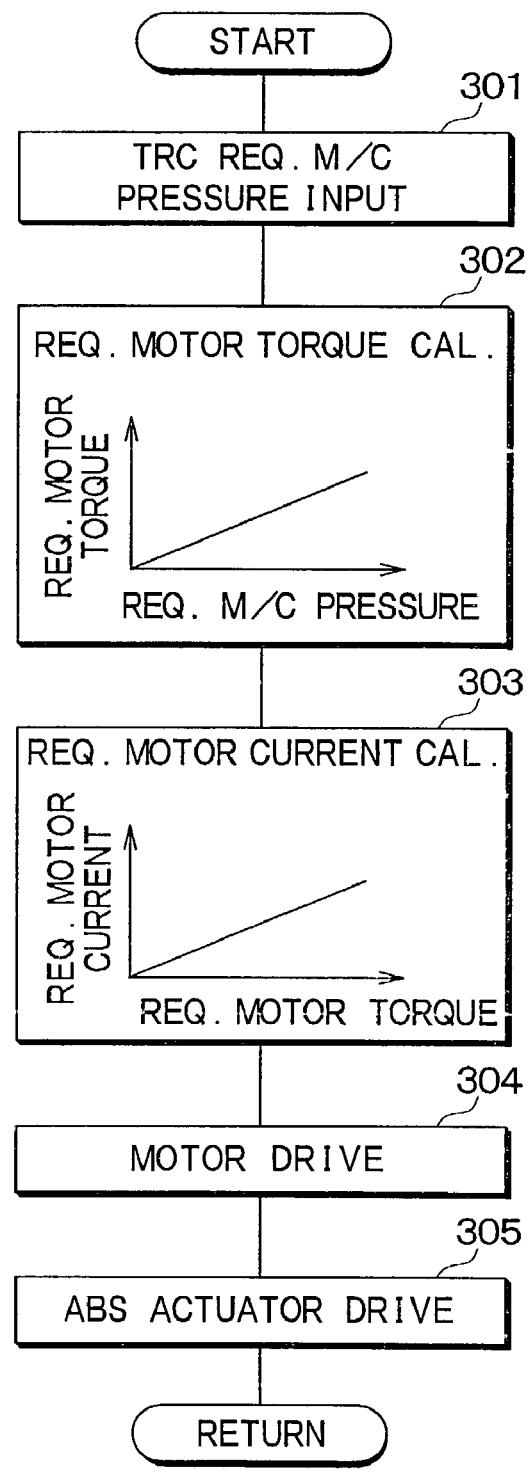
FIG. 4 shows a flow chart illustrating traction control processing according to the first embodiment.

FIG. 4 shows traction control processing that is executed by the ECU 10. The processing is executed, for example, if at least one driven wheels slips during acceleration.

At 301, the requisite M/C pressure for traction control (TRC) is calculated using conventional traction control processing. For example, the requisite M/C pressure is calculated based on a slip ratio that is calculated based on the wheel speed signals from the wheel speed sensors 11a–11d.

At 302 and 303, a motor torque and a requisite motor electrical current are respectively calculated based on the requisite M/C pressure as at 107 and 108 in FIG. 2. At 304, the requisite motor electrical current is applied to the motor 5 as at 109 in FIG. 2. At 305, the wheel slip of the driven wheel is restricted by driving respective elements of the ABS actuator 7 in a conventional manner to generate W/C pressures in the W/Cs 8a–8d.

Figure 5:
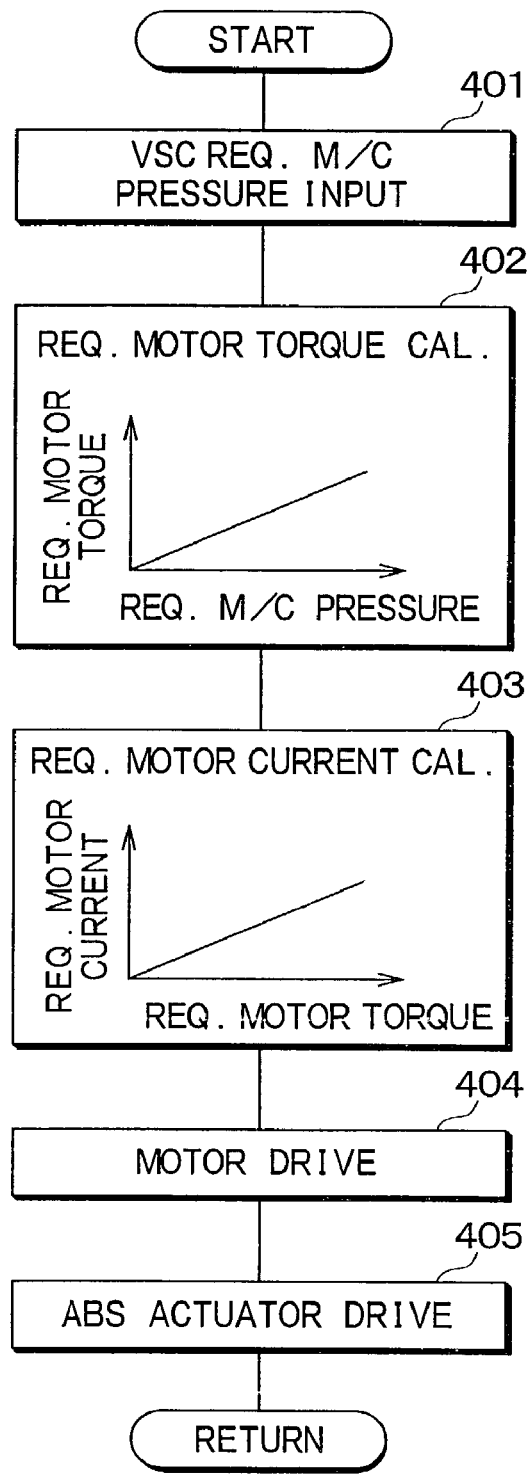
FIG. 5 shows a flow chart illustrating side skid control processing according to the first embodiment.

FIG. 5 shows side skid control processing that is executed by the ECU 10. The processing is executed, for example, if it is determined that the vehicle is skidding to one side or another.

At 401, the requisite M/C pressure as the side skid control (VSC) is calculated using conventional side skid control processing. For example, the requisite M/C pressure is calculated based on the side skid status (e.g., oversteer status or understeer status) that is determined by the signals from the yaw rate sensor 12 and the lateral acceleration sensor 13.

At 402 and 403, motor torque and requisite motor electrical current are respectively calculated based on the requisite M/C pressure as at 107 and 108 in FIG. 2. At 404, the requisite motor electrical current is applied to the motor 5 as at 109 in FIG. 2. At 405, the side skid of the vehicle is restricted by driving respective elements of the ABS actuator 7 in a conventional manner to generate W/C pressures in the W/Cs 8a–8d equipped in the control target wheels.

Accordingly, the electronic brake system of the first embodiment can perform brake boosting control, brake assist control, ACC, cooperation brake control with regenerative braking, traction control and side skid control. In the electronic brake system, the M/C pressure is generated by the motor 5 and the gear unit 6, and the W/C pressures are generated by the M/C pressure. Therefore, as a pump is not required, the electronic brake system has comparatively fewer parts, increased energy efficiency and reduced operational noise.

Second Embodiment

Figure 6:
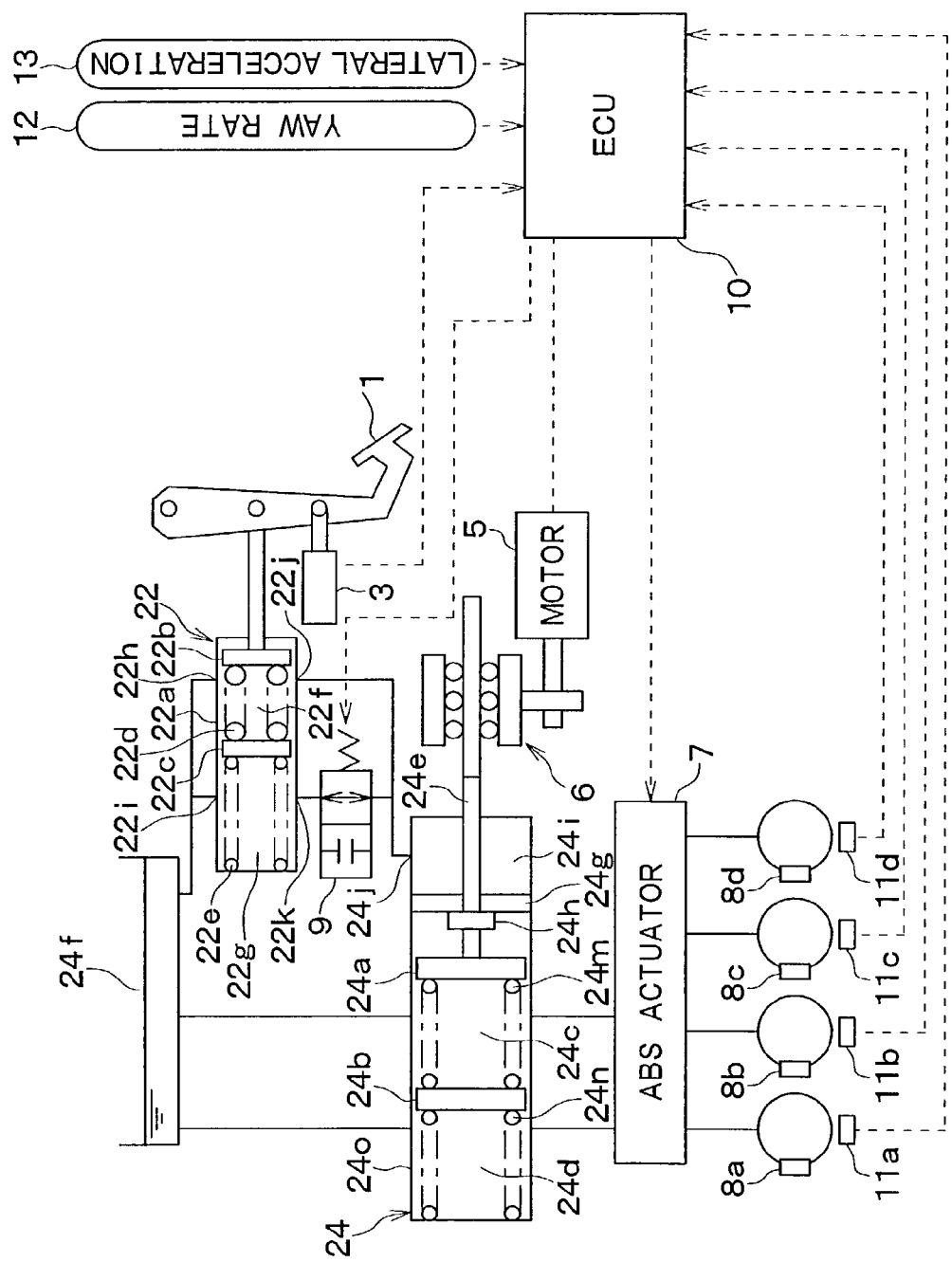
FIG. 6 shows a schematic view of an electronic brake system according to a second embodiment of a present invention.

Referring to FIG. 6, an electronic brake system of the second embodiment includes a failsafe cylinder 22 instead of the stroke simulator 2 mentioned in the first embodiment. Also, a M/C 24 is included in the electronic brake system instead of the M/C 4 mentioned in the first embodiment.

The failsafe cylinder 22 has a cylinder 22a, first and second pistons 22b and 22c, and first and second springs 22d and 22e. The first and second pistons 22b slide along an inside wall of the cylinder 22a and form first and second chambers 22f and 22g with the inside wall of the cylinder 22a. The first spring 22d is located in the first chamber 22f formed between the first and second pistons 22b and 22c. The second spring 22e is located in the second chamber 22g formed between the second piston 22c and end portion of the cylinder 22a. Therefore, if a brake pedal 1 is depressed by a driver, the first and second pistons 22b and 22c are moved to increase brake fluid pressure in the first and second chambers 22f and 22g.

The first spring 22d has a predetermined spring force to generate a reactive force to the brake pedal 1 when the brake pedal 1 is depressed. Therefore, pedal stroke and pedal pressure define an appropriate relationship. The second spring 22e has a predetermined spring force to act as a return spring.

The failsafe cylinder 22 has ports 22h, 22i, 22j and 22k. The ports 22h and 22i respectively connect the first and second chambers 22f and 22g to a M/C reservoir 24f equipped in the M/C 24. The ports 22j and 22k respectively connect the first and second chambers 22f and 22g to a failsafe pressurizing chamber 24i included in the M/C 24. When the first and second pistons 22b and 22c are not moved by the brake pedal 1, the ports 2h and 2i cause the first and second chambers 22f and 22g to communicate with the M/C reservoir 24f. On the other hand, when the first and second pistons 22b and 22c are moved by the brake pedal 1, the ports 2h and 2i are immediately closed by the first and second pistons 22b and 22c and cannot cause the first and second chambers 22f and 22g to communicate with the M/C reservoir 24f.

The M/C 24 has a cylinder 24o and first and second pistons 24a and 24b located in the cylinder 24o. An inside of the cylinder 24o is divided by the first and second pistons 24a and 24b into primary and secondary chambers 24c and 24d. The primary chamber 24c connects to a first brake conduit circuit, and the secondary chamber 24d connects to a second brake conduit circuit.

The M/C 24 also has a piston rod 24e that is movable in an axial direction thereof. The piston rod 24e is divided into two portions. One portion is joined to a gear unit 6, and the other portion is fixed to the first piston 24a in order to move in conjunction with the first piston 24a. The first and second pistons 24a and 24b are moved with the piston rod 24e so that M/C pressure (brake fluid pressures in the primary and secondary chambers 24c and 24d) and W/C pressures in respective W/Cs 8a–8d increase. Since the piston rod 24e is divided into two portions, the portion fixed to the first piston 24a can move the first and second pistons 24a and 24b to increase the M/C pressure without influencing the other portion joined to the gear unit 6. The M/C 24 has the M/C reservoir 24f connecting both of the chambers 24c and 24d.

The M/C 24 further has a failsafe piston 24g. The failsafe piston 24g is located on a side of the first piston 24a opposite the second piston 24b and divided from the piston rod 24e. The failsafe piston 24g has a hole portion at the center thereof through which the piston rod 24e is inserted. The piston rod 24e has a flange portion 24h located on the same side of the failsafe piston 24g as the first piston 24a. Therefore, the failsafe piston 24g returns the piston rod 24e to an initial position when the flange portion 24h abuts the failsafe piston 24g.

In the cylinder 24o, the failsafe pressurizing chamber 24i is formed by the failsafe piston 24g. A port 24j is formed in the cylinder 24o to connect the failsafe pressurizing chamber 24i to the ports 22j and 22k formed in the failsafe cylinder 22. A failsafe valve 9 constructed by 2-port valve is located between the port 24j and the port 22k to control the open mode or the close mode between the second chamber 22g of the failsafe cylinder 22 and the failsafe pressurizing chamber 24i. Return springs 24m and 24n are respectively located between the first and second pistons 24a and 24b and between the second piston 24b and a bottom portion of the cylinder 24o. Therefore, because the first and second pistons 24a and 24b are usually pushed to a side of a gear unit 6 (a motor 5), the first and second pistons 24a and 24b move together when the M/C 24 is operative.

When reference now to FIG. 7, the electronic brake system having the construction mentioned above executes brake fluid pressure control as follows.

Figure 7:
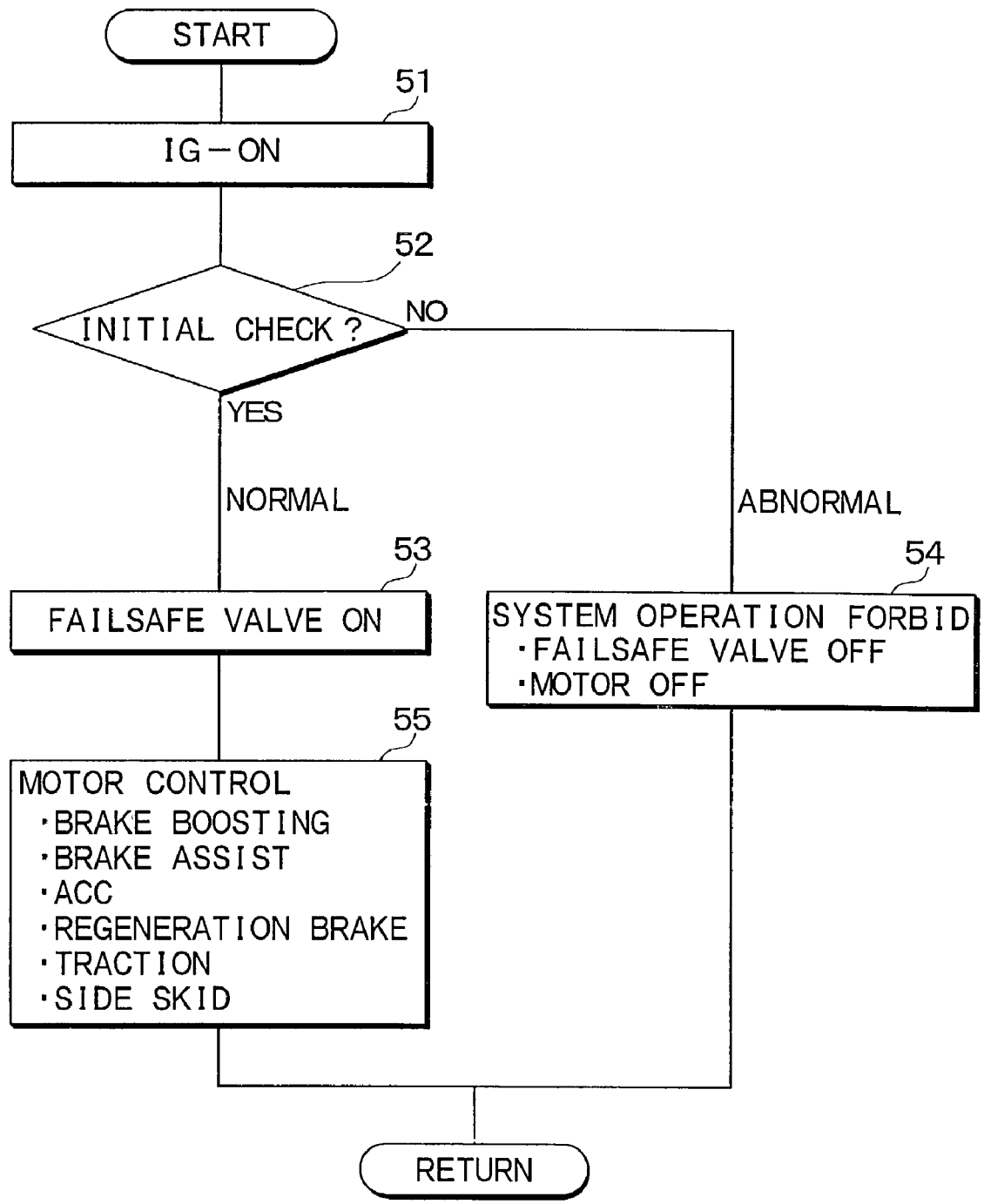
FIG. 7 shows a flow chart illustrating brake system control processing according to the second embodiment.

FIG. 7 shows processing executed by an ECU 10. When an ignition switch (IG) is turned on at 51, an initial check is executed to determine whether the electronic brake system is normal. The initial check is for checking the motor 5, the failsafe valve 9, the ECU 10, electrical resource system or sensors 3, 11a–11d, 12 and 13, and is automatically executed by the ECU 10 before a vehicle is operated. If the ECU 10 determines that the system is normal, a system normal control mode (a first operation mode) is selected. If the ECU 10 determines a system malfunction, a system abnormal control mode (a second operation mode) is selected.

When the system normal control mode is selected, an electrical current is applied to the failsafe valve 9 (i.e., the fail safe valve 9 is ON) to shut off communication between the failsafe cylinder 22 and the M/C 24 at 53. Then, at 55, the electronic brake system of the present embodiment performs brake boosting control, brake assist control, ACC, cooperation brake control with regenerative braking, traction control and side skid control based on a vehicle condition. These brake controls are the same as described in FIGS. 2 to 5 and as in the first embodiment.

In the system normal control mode, since the failsafe valve 9 closes between the failsafe cylinder 22 and the M/C 24, the second chamber 22g of the failsafe cylinder 22 is sealed. Also, because the first chamber 22f of the failsafe cylinder 22 communicates with the failsafe pressurizing chamber 24i, the brake pedal 1 can stroke based on depression thereof by the driver. Therefore, the first chamber 22f acts as a stroke simulator when the system is normal. As a result, pedal stroke and pedal pressure can define an appropriate relationship based on features of the spring 22d located in the first chamber 22f.

Upon the stroke of the brake pedal 1, the motor 5 is driven based on a detected signal from the pedal operation amount sensor 3 and the above mentioned brake controls. Then, the piston rod 24e is driven by the motor 5 via the gear unit 6, and the M/C piston 24a and 24b are pushed to increase the M/C pressure. Therefore, the W/C pressures are generated with respect to the M/C pressure. In this condition, the failsafe piston 24g and the piston rod 24e are divided from each other to move independently so that the motor 5 can control the M/C pressure without influencing the pedal stroke of the brake pedal. Therefore, the M/C pressure increases even if the driver does not push the brake pedal 1.

On the other hand, when the system abnormal control mode is selected, electrical current is not applied to the failsafe valve 9 (i.e., the failsafe valve is OFF) to open communication between the failsafe cylinder 22 and the M/C 24 at 54, and the motor 5 is turned off. That is, the ECU 10 inhibits electrical system operation. Therefore, in the system abnormal control mode, brake fluid pushed by the brake pedal 1 is moved into the failsafe pressurizing chamber 24i via the ports 22f and 22k. Accordingly, the failsafe piston 24g is pushed toward the first and second pistons 24a and 24b by brake fluid pressure in the failsafe pressurizing chamber 24i so that the first and second pistons 24a and 24b are pushed via flange portion 24h of the piston rod 24e. As a result, the M/C pressure and the W/C pressures are generated.

As mentioned above, since the W/C pressures are generated by brake fluid in the first and second chambers 22f and 22g when the system is abnormal, sufficient W/C pressures can be obtained. Further, the piston rod 24e is divided into two portions respectively connecting the first piston 24a and the gear unit 6. Therefore, the piston rod 24e can move without resistance of the motor 5 and the gear unit 6 to generate the M/C pressure. Also, the M/C pressure is generated by direct input from the brake pedal 1 even if the motor 5 or the gear unit 6 locks and therefore malfunctions.

A feature between the pedal pressure and the brake fluid pressure during the system abnormal control mode can be selected based on a pressurized cross sectional area of the failsafe cylinder 2. Therefore, the feature can be defined to satisfy a required condition during the system abnormal control mode.

In the system abnormal control mode, both chambers 22f and 22g can communicate with the failsafe pressurizing chamber 24i to provide sufficient brake fluid. Accordingly, excessive pedal stroke during the system abnormal control mode can be avoided.

Subsequently, the electronic brake system of the present embodiment performs brake boosting control, brake assist control, ACC, cooperation brake control with regenerative braking, traction control and side skid control based on a vehicle condition.

Accordingly, the electronic brake system of the second embodiment can perform brake boosting control, brake assist control, ACC, cooperation brake control with regenerative braking, traction control and side skid control. In the electronic brake system, the M/C pressure is generated by the motor 5 and the gear unit 6, and the W/C pressures are generated by the M/C pressure. Therefore, as a pump is not required, the electronic brake system has a comparatively fewer number of parts, increases system energy efficiency and decreases operational noise.

Also, according to the electronic brake system of the second embodiment, the divided piston rod 24e can be pushed by brake fluid pressure in the failsafe pressurizing chamber 4i, which is directly increased by pedal operation, without influencing the motor 5 and the gear unit 6. Therefore, braking force is generated even if the system normal control mode is non-operative.

Third Embodiment

Figure 8:
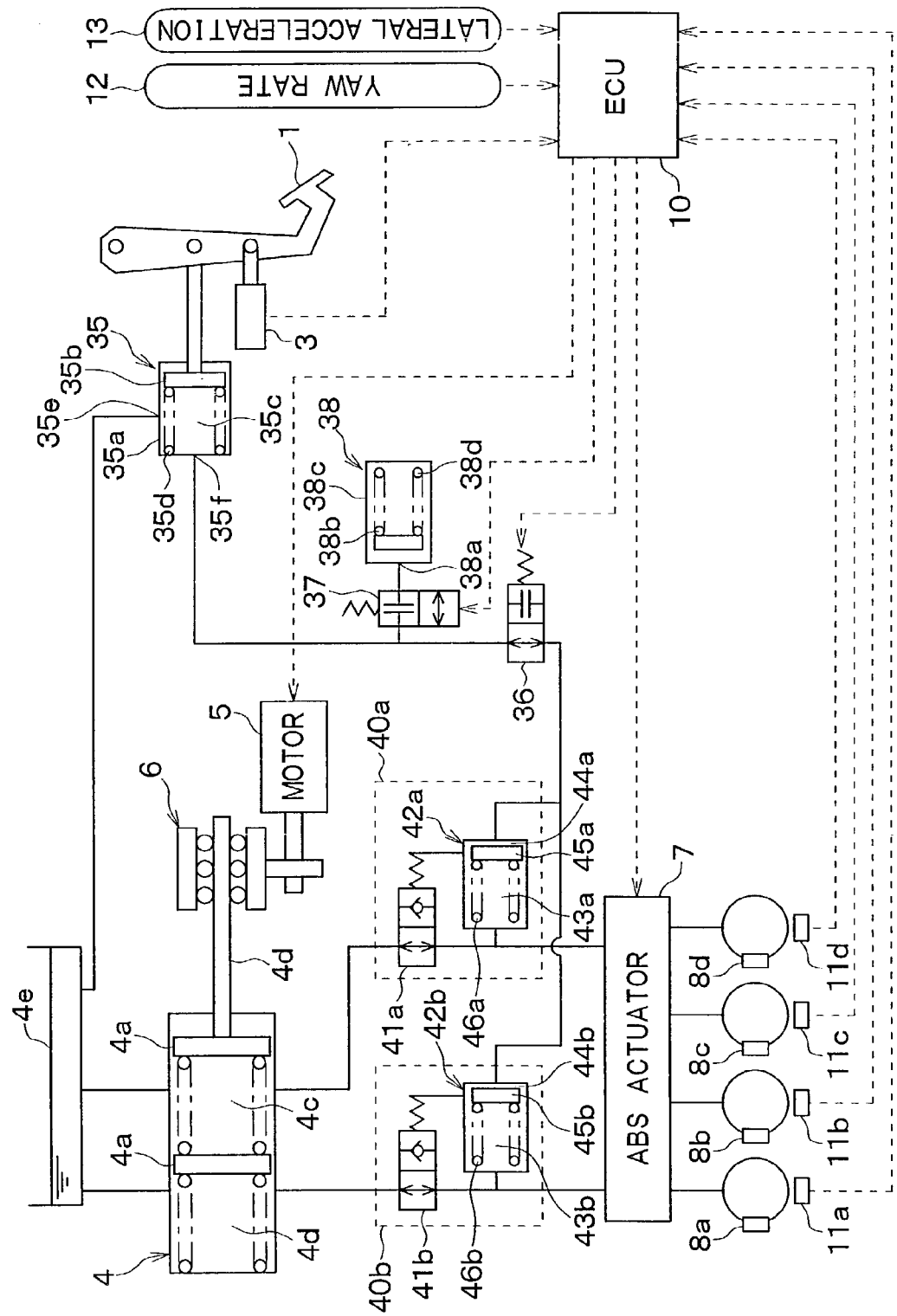
FIG. 8 shows a schematic view of an electronic brake system according to a third embodiment of a present invention.

Referring to FIG. 8, an electronic brake system according to a third embodiment includes a failsafe cylinder 35, a failsafe valve 36, a cut valve 37, a stroke simulator 38 and check valves 40a and 40b. Other elements are the same as in the first embodiment.

The failsafe cylinder 35 has a cylinder 35a, a piston 35b, a chamber 35c and a spring 35d. The piston 35b slides along an inside wall of the cylinder 35a. The cylinder 35a and the piston 35b form the chamber 35c in which the spring 35d is located. Therefore, when a driver pushes a brake pedal 1, the piston 35b is pushed together with the brake pedal 1 and the brake fluid pressure in the chamber 35c increases. As in the second embodiment, a feature between the pedal pressure and the brake fluid pressure during the system abnormal control mode can be selected based on a pressurized cross sectional area of the failsafe cylinder 35. Therefore, the feature can be defined for satisfying a requisite condition during the system abnormal control mode.

The failsafe cylinder 35 also has ports 35e and 35f. The port 35e connects the chamber 35c to a M/C reservoir 4e, while the port 35f connects the chamber 35c to the change valves 40a and 40b.

The failsafe valve 36 is located between the port 35f of the failsafe cylinder 35 and the check valves 40a and 40b. The failsafe valve 36 is a normally open valve that provides communication between the port 35f and the check valves 40a and 40b when an electrical current is not applied thereto.

The cut valve 37 is located between the port 35f of the failsafe cylinder 15 and the stroke simulator 38. The cut valve 37 is a normally closed valve that closes between the port 35f and the stroke simulator 38 when an electrical current is not applied thereto.

The stroke simulator 38 has a port 38a, a piston 38b, a cylinder 38c and a spring 38d. The piston 38b slides along the inside wall of the cylinder 38c and is pushed by brake fluid when the cut valve 37 is opened by an electrical current. The spring 38d is for providing a reactive force to the piston 38b. Therefore, when a driver pushes the brake pedal 1, the cut valve 37 enables the failsafe cylinder 35 to communicate with the stroke simulator 38. Thus, a reactive force stroke corresponding pedal operation is applied to the brake pedal 1 based on the spring force of the spring 38d, and a given pedal stroke is acquired.

The change valves 40a and 40b are of identical construction. The change valve 40a connects a primary chamber 4c of the M/C 4 and a first brake circuit. The change valve 40b connects a secondary chamber 4d of the M/C 4 and a second brake circuit.

The following description specifically references the change valve 40a, as the change valve 40b is identical structure. The change valve 40a has a two-position valve 41a and a change valve cylinder 42a. The two-position valve 41a is located between the primary chamber 4c of the M/C 4 and an ABS actuator 7. The two-position valve 41a is operative in conjunction with an operation of the piston 45a located in the change valve cylinder 42a to select an open mode or a check valve mode. In the open mode, the brake fluid freely flows between the primary chamber 4c and the ABS actuator 7. In the check valve mode, brake fluid is allowed to only flow from the M/C 4 to the ABS actuator 7 by a check valve equipped in the two-position valve 40a to generate a pressure differential between the primary chamber 4c and the ABS actuator 7. Therefore, brake fluid pressure generated in the failsafe cylinder 35 directly applies to respective W/Cs 8a–8d. The two-position valve 41a is in the open mode when an electrical current is not applied thereto.

The change valve cylinder 42a has first and second cylinder chambers 43a and 44a. The first and second cylinder chambers 43b and 44b are divided by a piston 45a, but the total brake fluid amount therein is constant. The first cylinder chamber 43a connects to a conduit connecting between the M/C 4 and the ABS actuator 7. The second cylinder chamber 44a connects the failsafe cylinder 35 through the failsafe valve 16.

As shown in FIG. 8, the piston 45a is pushed by the spring 46a to decrease the second cylinder chamber 44a before brake fluid pressure is applied in the first and second cylinder chambers 43a and 44a. In this condition, since the piston 45a does not move, the two-position valve 41a is in the open mode. Therefore, brake fluid can freely flow between the M/C 4 and the ABS actuator 7.

When the piston 45a is pushed toward to the first cylinder chamber 43a based on the discharged brake fluid pressure from the failsafe cylinder 35, the two-position valve 41a changes to the check valve mode. Therefore, the brake fluid cannot flow from the ABS actuator 7 to the M/C 4 so that W/C pressures increase based on the brake fluid discharged from the first cylinder chamber 43a through the ABS actuator 7.

Accordingly, if brake fluid pressure generated in the failsafe cylinder 35 is higher than that generated in the M/C 4, the two-position valve 41a operates in the check valve mode. Therefore, the brake fluid pressure generated in the failsafe cylinder 35 is directly applied to the ABS actuator 7 to generate respective W/Cs 8a–8d without releasing toward the M/C 4.

On the other hand, if the brake fluid pressure generated in the failsafe cylinder 35 is lower than that generated in the M/C 4, the two-position valve 41a operates in the check valve mode. Therefore, the brake fluid pressure generated in the M/C 4 is directly applied to the ABS actuator 7 to generate respective W/Cs 8a–8d without releasing toward the failsafe valve 35.

In the electronic brake system of the third embodiment, the ECU 10 drives not only the motor 5 and the ABS actuator 7 but also the failsafe valve 36 and the cut valve 37 based on the signals from the respective sensors 3, 11a–11d, 12 and 13.

Figure 9:
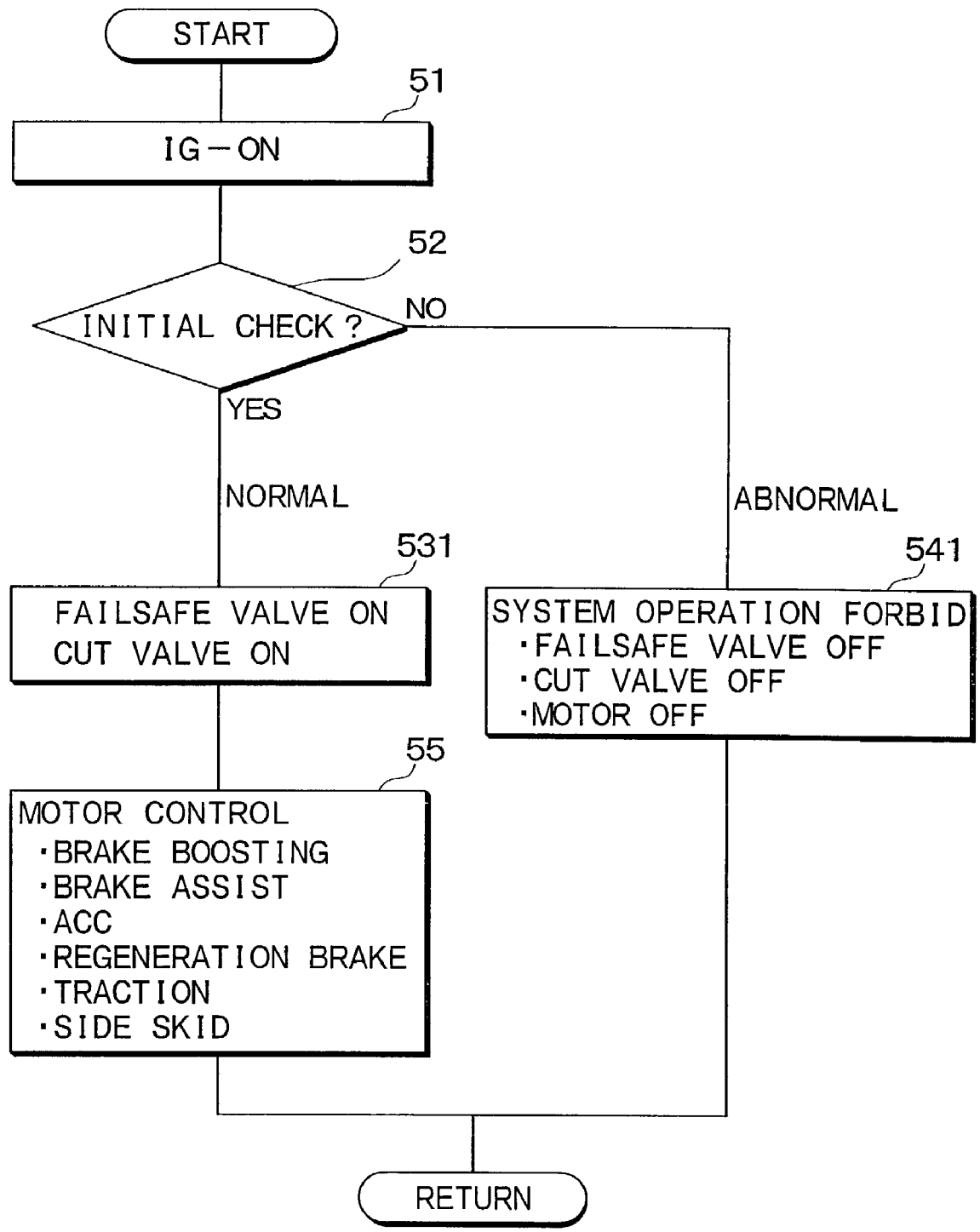
FIG. 9 shows a flow chart illustrating brake system control processing according to the third embodiment.

With reference to FIG. 9, the electronic brake system having the construction mentioned above executes brake fluid pressure control as follows. FIG. 9 shows the processing that is executed by the ECU 10. When an ignition switch (IG) is turned on at 51, an initial check is executed to determine whether the electronic brake system is normal. This determination is executed as in the second embodiment. If the ECU 10 determines that the system is normal, a system normal control mode (a first operation mode) is selected. If the ECU 10 detects a system malfunction, a system abnormal control mode (a second operation mode) is selected.

When the system normal control mode is selected, an electrical current is applied to the failsafe valve 36 (i.e., the failsafe valve 36 is ON) to close communication between the failsafe cylinder 35 and the change valves 40a and 40b at 53. An electrical current is also applied to the cut valve 37 (i.e., the cut valve 37 is ON) to open communication between the failsafe cylinder 35 and the stroke simulator 38. Then, at 55, the electronic brake system of the present embodiment performs brake boosting control, brake assist control, ACC, cooperation brake control with regenerative braking, traction control and side skid control based on a vehicle condition. These brake controls are the same as discussed in connection with the first embodiment shown in FIGS. 2 to 5.

Upon stroking of the brake pedal 1, because the failsafe valve 36 closes between the failsafe cylinder 35 and the M/C 4, the brake fluid pressure generated in the failsafe cylinder 35 flows to the stroke simulator 38 without flowing to the change valves 40a and 40b. Therefore, the stroke simulator 38 acts when the system is normal. As a result, pedal stroke and pedal pressure can define an appropriate relationship based on the spring feature of the spring 38d located in the stroke simulator 38.

Also, the two-position valves 40a and 40b open between the M/C 4 and the ABS actuator 7 because the pistons 45a and 45b do not move. The motor 5 is driven based on the signals from the pedal operation sensor 3 with the stroke of brake pedal 1. Then, the piston rod 4d is driven by the motor 5 via the gear unit 6, and the M/C pistons 4a are pushed to increase the M/C pressure. Therefore, W/C pressures are generated corresponding to the M/C pressure. In this status, the M/C pressure is independently controlled by the motor 5 without being influenced by the pedal stroke of the brake pedal. Therefore, the M/C pressure increases even if the driver does not push the brake pedal 1.

On the other hand, when the system abnormal control mode is selected, electrical current is not applied to the failsafe valve 36 (i.e., the failsafe valve is OFF) to open communication between the failsafe cylinder 35 and the M/C 4 at 541, and the motor 5 is turned off. Further, electrical current is not applied to the cut valve 37 (i.e., the cut valve is OFF) to close communication between the failsafe cylinder 35 and the stroke simulator 38. That is, the ECU 10 inhibits electronic system operation. Therefore, in the system abnormal control mode, brake fluid pushed by the brake pedal 1 is moved into the second chambers 44a and 44b of the check valve chambers 40a and 40b. The pistons 45a and 45b are pushed toward the side of the first chambers 43a and 43b because the brake fluid pressure in the M/C 4 is zero. Accordingly, the two-position valves 41a and 41b are in the check valve mode so that the brake fluid pressure generated in the failsafe cylinder 35 by the stroke of the brake pedal 1 is transmitted to respective W/Cs 8a–8d through the change valves 40a and 40b and the ABS actuator 7.

As mentioned above, since the W/C pressures are generated by brake fluid in the failsafe cylinder 35 when the system is abnormal, sufficient W/C pressures can be obtained.

Accordingly, the electronic brake system of the third embodiment can perform brake boosting control, brake assist control, ACC, cooperation brake control with regenerative braking, traction control and side skid control. In the electronic brake system, the M/C pressure is generated by the motor 5 and the gear unit 6, and the W/C pressures are generated by the M/C pressure. Therefore, as a pump is not required, the electronic brake system has comparatively fewer parts, increases system energy efficiency and decreases operational noise.

Also, in the electronic brake system of the third embodiment, the W/C pressures are generated by brake fluid in the failsafe cylinder 35 without using the M/C 4 even if the motor 5 cannot be controlled. Therefore, the driver can generate braking force by pushing the brake pedal 1.

(Modification)

The electronic brake systems of the first to third embodiments determine the requisite braking force based on the signals from respective sensors 3, 11a–11b, 12 and 13, and therefore the requisite M/C pressure is determined based on the requisite braking force during brake boosting control, brake assist control, ACC, and cooperation brake control with regenerative braking. However, the electronic braking system may be alternatively adapted to directly determine the requisite M/C pressure based on the signals form respective sensors 3, 11a–11b, 12 and 13.

The electronic brake systems of the first to third embodiments perform brake boosting control, brake assist control, ACC, cooperation brake control with regenerative braking, traction control and side skid control. However, these respective controls may be alternatively adapted.

While the above description is of the preferred embodiments of the present invention, it should be appreciated that the invention may be modified, altered, or varied without deviating from the scope and fair meaning of the following claims.

What is claimed is:

1. An electronic brake system including:
   a brake pedal operable according to a requisite braking force;
   a failsafe cylinder for generating a brake fluid pressure in conjunction with operation of the brake pedal;
   wheel cylinders equipped at respective vehicle wheels, for generating respective braking forces at the respective vehicle wheels;
   a master cylinder for generating brake fluid pressure and applying the brake fluid pressure to the wheel cylinders to generate the respective wheel pressures; and
   a motor for controlling the brake fluid pressure in the master cylinder;
   wherein the electronic brake system is operative in a first operational mode and a second operational mode is operative,
   in the first operational mode, brake fluid pressures in the wheel cylinders are generated based on the brake fluid pressure in the master cylinder with driving of the motor, and
   in the second operational mode, the brake fluid pressures in the wheel cylinders are generated based on the brake fluid pressure generated in the failsafe cylinder without driving the motor; and, in the second operational mode, the brake fluid pressure in the master cylinder is controlled by the brake fluid pressure generated in the failsafe cylinder, and the controlled brake fluid pressure in the master cylinder is provided to the wheel cylinders to control the respective brake fluid pressures in the wheel cylinders.

2. The electronic brake system according to claim 1, further comprising:
   a pedal operation amount detection portion for detecting an operation amount of the brake pedal;
   wherein, in the first operational mode, the motor is driven based on the pedal operation amount detected by the pedal operation amount detection portion and then controls the brake fluid pressure in the master cylinder and the wheel cylinders.

3. The electronic brake system according to claim 1, wherein the failsafe cylinder includes a piston for being driven by the operation of the brake pedal and a cylinder portion for accommodating the piston, and the failsafe cylinder generates the brake fluid pressure based on a movement of the piston, the master cylinder includes first and second master pistons, a cylinder portion for accommodating the first and second master pistons, first and second chambers formed by the first and second master pistons and the cylinder portion, a failsafe piston, and failsafe pressurizing chamber formed by the failsafe piston and the cylinder portion thereof and connected to the cylinder portion of the failsafe cylinder, wherein brake fluid pressures in the first and second chambers are controlled by movements of the first and second master pistons and are provided to the wheel cylinders, and the first and second master pistons are moved in conjunction with movement of the failsafe piston, in the first operational mode, brake fluid pressures in the first and second chambers of the master cylinder are controlled based on the movement of the first and second master pistons by driving of the motor, in the second operational mode, the brake fluid pressures in the first and second chambers of the master cylinder are controlled based on the movement of the failsafe piston by a brake fluid pressure in the failsafe pressurizing chamber that is increased based on the brake fluid pressure in the failsafe cylinder.

4. The electronic brake system according to claim 3, further comprising:

a valve located between the failsafe cylinder and the master cylinder;

wherein the piston of the failsafe cylinder includes first and second pistons, and the cylinder portion of the fail safe cylinder includes a first chamber formed between the first and second pistons and a second chamber formed between the second piston and a bottom portion of the cylinder portion, wherein the first and second chambers of the failsafe cylinder are connected to the failsafe pressurizing chamber of the master cylinder via a conduit opened and closed by the valve, the valve is controlled to close the conduit in the first operational mode and controlled to open the conduit in the second operational mode.

5. The electronic brake system according to claim 3, wherein the master cylinder includes a piston rod formed with the first master piston and for being driven by the motor, wherein the piston rod is inserted in a hole formed in the failsafe piston, has a flange portion located on a side of the failsafe piston to the first master piston, and moves with the flange portion independent of the failsafe piston.

6. The electronic brake system according to claim 1, further comprising:

a gear unit for converting rotational power generated by the motor to linear motion, wherein a piston rod equipped in the master cylinder is driven by the motor through the gear unit.

7. The electronic brake system according to claim 1, wherein the brake fluid pressure to be generated by the master cylinder is defined based on a pedal pressure or a pedal stroke as the pedal operation amount, and the motor is driven to generate the brake fluid pressure defined based on the pedal pressure or the pedal stroke.

8. The electronic brake system according to claim 1, wherein the brake fluid pressure to be generated by the master cylinder is defined based on a pressure value equal to a pressure calculated based on a pedal pressure or a pedal stroke as the pedal operation amount minus a pressure calculated based on a regenerative braking force, and the motor is driven to generate the brake fluid pressure defined based on the pressure value.

9. The electronic brake system according to claim 1, wherein the brake fluid pressure to be generated by the master cylinder is defined based on a distance between the vehicle and a vehicle in front of the vehicle, and the motor is driven to generate the defined brake fluid pressure.

10. The electronic brake system according to claim 1, further comprising:

a vehicle condition detection portion for detecting a vehicle condition;

wherein the brake fluid pressure generated by the master cylinder is defined based on the vehicle condition detected by the vehicle condition detection portion and the pedal operation amount detected by the pedal operation amount detection portion, and the motor is driven to generate the defined brake fluid pressure.

11. The electronic brake system according to claim 10, wherein wheel slippage caused by vehicle acceleration is determined based on the vehicle condition detected by the vehicle condition detection portion, and the brake fluid pressure generated by the master cylinder is defined based on the wheel slippage.

12. The electronic brake system according to claim 10, wherein vehicle wheel side skidding is determined based on the vehicle condition detected by the vehicle condition detection portion, and the brake fluid pressure generated by the master cylinder is defined based on the vehicle wheel side skidding.

13. An electronic brake system comprising:

a brake pedal operable according to a requisite braking force;

a failsafe cylinder for generating a brake fluid pressure in conjunction with operation of the brake pedal;

wheel cylinders equipped at respective vehicle wheels, for generating respective braking forces at the respective vehicle wheels;

a master cylinder for generating brake fluid pressure and applying the brake fluid pressure to the wheel cylinders to generate the respective wheel pressures; and a motor for controlling the brake fluid pressure in the master cylinder;

wherein the electronic brake system is operative in a first operational made and a second operational mode is operative, in the first operational mode, brake fluid pressure in the wheel cylinders are generated based on the brake fluid pressure in the master cylinder with driving of the motor, and in the second operational mode, the brake fluid pressures in the wheel cylinders are generated based on the brake fluid pressure generated in the failsafe cylinder without driving the motor, a gear unit for converting rotational power generated by the motor to linear motion, wherein a piston rod equipped in the master cylinder is driven by the motor through the gear unit, wherein the piston rod includes a first portion connected to a first master piston and a second portion jointed to the gear unit, the first portion and the second portion are separable from each other.

14. An electronic brake system comprising:

a brake pedal operable according to a requisite braking force;

a failsafe cylinder for generating a brake fluid pressure in conjunction with operation of the brake pedal;

wheel cylinders equipped at respective vehicle wheels, for generating respective braking faces at the respective vehicle wheels;

a master cylinder far generating brake fluid pressure and applying the brake fluid pressure to the wheel cylinders to generate the respective wheel pressures; and a motor for controlling the brake fluid pressure in the master cylinder;

wherein the electronic brake system acts in a first operational mode and a second operational mode, in the first operational mode, brake fluid pressure in the wheel cylinders are generated based on the brake fluid pressure in the master cylinder by driving of the motor, and in the second operational mode, the brake fluid pressure generated in the failsafe cylinder is provided to the brake fluid pressures in the wheel cylinders without driving of the motor, a change valve for selecting the master cylinder the failsafe cylinder as a brake fluid pressure provision resource to the wheel cylinders;

wherein the failsafe cylinder includes a piston for being driven by the operation of the brake pedal and a cylinder portion for accommodating piston, the failsafe cylinder generates the brake fluid pressure based on a movement of the piston, the master cylinder includes first and second master pistons, a cylinder portion for accommodating the first and second master pistons, and first and second chambers formed by the first and second master pistons and the cylinder portion, in the first operational mode, the brake fluid pressure in the first and second chambers of the master cylinder are controlled based on the movement of the first and second master pistons by driving of the motor, and the change valve selects the master cylinder as the brake fluid pressure provision resource to the wheel cylinders, and in the second operational mode, the change valve selects the failsafe cylinder as a brake fluid pressure provision resource to the wheel cylinders.

15. The electronic brake system according to claim 14, wherein the change valve comprises:

a change valve cylinder having a piston that is moved based on the brake fluid pressure in the failsafe cylinder to generate brake fluid pressure in the wheel cylinders; and a two-position valve for controlling brake fluid flow between the master cylinder and the wheel cylinder based on a movement of the piston of the change valve.

16. The electronic brake system according to claim 14, further comprising:

a failsafe valve located between the failsafe cylinder and the change valve for opening or closing communication between the failsafe cylinder and the change valve, wherein failsafe valve opens between the failsafe cylinder and the change valve in the first operational mode, and opens between the failsafe cylinder and the change valve in the second operational mode.

17. The electronic brake system according to claim 15, wherein a two-position valve is located between the master cylinder and the change valve cylinder to allow brake fluid flow between the master cylinder and the wheel cylinder in the first operational mode, and to inhibit the brake fluid flow between the master cylinder and the wheel cylinder in the second operational mode.

18. The electronic brake system according to claim 16, further comprising:

a stroke simulator located between the failsafe valve and the failsafe cylinder and having a piston for being moved by the brake fluid pressure generated in the failsafe cylinder and a spring for pushing the piston; and a cut valve for controlling open and close between the failsafe valve and the stroke simulator;

wherein the cut valve opens between the failsafe cylinder and the stroke simulator in the first operational mode, and closes between the failsafe cylinder and the stroke simulator in the second operational mode, and the stroke simulator provides a reactive force to the brake pedal at the first operational mode.

19. The electronic brake system according to claim 14, wherein the brake fluid pressure to be generated by the master cylinder is defined based on a pedal pressure or a pedal stroke as the pedal operation amount, and the motor is driven to generate the brake fluid pressure defined based on the pedal pressure or the pedal stroke.

20. The electronic brake system according to claim 14, wherein the brake fluid pressure to be generated by the master cylinder is defined based on pressure value equal to a pressure calculated based on a pedal pressure or a pedal stroke as the pedal operation amount minus a pressure calculated based on a regenerative braking force, and the motor is driven to generate the brake fluid pressure defined based on the pressure value.

21. The electronic brake system according to claim 14, wherein the brake fluid pressure to be generated by the master cylinder is defined based on a distance between the vehicle and a vehicle in front of the vehicle, and the motor is driven to generate the defined brake fluid pressure.

22. The electronic brake system according to claim 14, further comprising:

a vehicle condition detection portion for detecting a vehicle condition;

wherein the brake fluid pressure generated by the master cylinder is defined based on the vehicle condition detected by the vehicle condition detection portion and the pedal operation amount detected by the pedal operation amount detection portion, and the motor is driven to generate the defined brake fluid pressure.

23. The electronic brake system according to claim 22, wherein wheel slippage caused by vehicle acceleration is determined based on the vehicle condition detected by the vehicle condition detection portion, and the brake fluid pressure generated by the master cylinder is defined based on the wheel slippage.

24. The electronic brake system according to claim 22, wherein vehicle wheel side skidding is determined based on the vehicle condition detected by the vehicle condition detection portion, and the brake fluid pressure generated by the master cylinder is defined based on the vehicle wheel side skidding.

* * * * *